United States Patent [19]

Dannels et al.

[11] 4,370,122

[45] Jan. 25, 1983

[54] APPARATUS FOR RUNNERLESS INJECTION COMPRESSION MOLDING OF THERMOSETTING MATERIALS

[75] Inventors: W. Andrew Dannels, Grand Island, N.Y.; Robert W. Bainbridge, Gainesville, Ga.

[73] Assignee: Occidental Chemical Corporation, Niagara Falls, N.Y.

[21] Appl. No.: 278,237

[22] Filed: Jun. 29, 1981

Related U.S. Application Data

[63] Continuation-in-part of Ser. No. 118,381, Feb. 5, 1980, Pat. No. 4,290,744, which is a continuation-in-part of Ser. No. 972,182, Dec. 21, 1978, abandoned, and a continuation-in-part of Ser. No. 164,412, Jun. 30, 1980, Pat. No. 4,309,379, which is a continuation-in-part of Ser. No. 972,189, Dec. 21, 1978, Pat. No. 4,238,181.

[51] Int. Cl.³ ............................ B29G 3/00; B29F 1/08
[52] U.S. Cl. .................................. 425/543; 425/548; 425/572; 425/588; 264/328.7
[58] Field of Search ............... 425/543, 544, 548, 549, 425/572, 574, 575, 588, 589, 590; 264/328.7

[56] References Cited

U.S. PATENT DOCUMENTS

| | | | |
|---|---|---|---|
| 3,591,897 | 7/1971 | Perras | 425/548 X |
| 3,632,729 | 1/1972 | Bielfeldt | 264/294 |
| 3,787,159 | 1/1974 | Bielfeldt | 425/167 |
| 3,807,921 | 4/1974 | Murgatroyd | 425/562 X |
| 3,819,312 | 6/1974 | Arpajian | 425/543 |
| 4,017,242 | 4/1977 | Mercer | 425/548 X |

FOREIGN PATENT DOCUMENTS

743854 10/1966 Canada ........................... 425/562
1487410 5/1967 France .

*Primary Examiner*—Thomas P. Pavelko
*Attorney, Agent, or Firm*—James F. Tao; James F. Mudd; William G. Gosz

[57] ABSTRACT

The apparatus of the present invention includes a stationary assembly and a movable assembly. The stationary assembly is comprised of a stationary platen which has a heat plate mounted thereon, a temperature-controlled sprue bushing mounted in the heat plate and a plurality of mold faces positioned on the heat plate surrounding the periphery of the sprue bushing. The movable assembly is comprised of a movable platen which has a heat plate mounted thereon and a plurality of mold faces, corresponding to, and adapted to be aligned with, the mold faces on the stationary assembly. Means are provided to move the movable assembly into close proximity with the stationary assembly to form partially open mold cavities. Means are provided to feed a supply of thermosetting molding material through the sprue bushing into a manifold area and into the partially open mold cavities. Means are provided to completely close the mold cavities and place the apparatus in a compression stage. In the compression stage, the manifold area is eliminated by closure of the stationary and movable assemblies. Means are also provided for the subsequent retraction of the movable assembly to allow removal of the molded article and access to the mold area.

11 Claims, 8 Drawing Figures

APPARATUS FOR RUNNERLESS INJECTION COMPRESSION MOLDING OF THERMOSETTING MATERIALS

RELATED APPLICATIONS

The present application is a continuation-in-part of U.S. Ser. No. 118,381, filed Feb. 5, 1980 now U.S. Pat. No. 4,290,744, in turn a continuation-in-part of U.S. Ser. No. 972,182, filed Dec. 21, 1978, now abandoned both entitled, "Apparatus for Runnerless Injection-Compression Molding Thermosetting Materials", and of U.S. Ser. No. 164,412, filed June 30, 1980, now U.S. Pat. No. 4,309,379, in turn a continuation-in-part of U.S. Ser. No. 972,189, filed Dec. 21, 1978, now U.S. Pat. No. 4,238,181, both entitled, "Method and Apparatus for Runnerless—Compression Molding Thermosetting Materials".

BACKGROUND OF THE INVENTION

The present invention relates to an apparatus for molding thermosetting materials and, more particularly, to the molding of thermosetting synthetic resin compositions.

Injection molding is an advantageous method of forming articles of synthetic resin. In general terms, injection molding is a process wherein the molding composition, in a melted or plasticized state, is injected into a mold cavity. Typically, molding composition in granular form is fed from a hopper into a heated cylinder containing a screw, or ram. The molding composition is heated, melted and plasticized in the heated cylinder area, and then the screw, or ram, injects the melted and plasticized material into a mold cavity. In the case of thermosetting material, the molded material is cured in the mold by compaction and by heat added to the mold cavity. After curing, the article is ejected from the mold and the process repeated.

Injection molding offers the advantage of reduced molding cycles, better control of process variables and increased productivity as compared with conventional compression and transfer molding processes. The major disadvantage with the injection molding of thermosetting materials is the generation of a considerable amount of waste material, particularly when multiple cavity systems are employed. The waste material is generated by thermosetting material that has cured, become infusible, in the runner and sprue system and cannot be reused. The amount of non-reusable waste material generated in this fashion can be substantial, ranging typically from about 15 to about 80 percent of the total amount of material required to mold an article.

A more recent technical advance in the molding art has been the adaptation of the runnerless injection, or cold manifold, process to the injection molding of thermosetting resins. In the cold manifold process, the material in the sprue and manifold system is maintained at a temperature sufficient to maintain the material in a plasticized condition, without causing the material to prematurely cure, or "set-up." Thus, when a cured part is removed from the mold cavity, the material in the sprue and manifold becomes part of the next molding instead of being discarded as in conventional injection molding operations. The runnerless injection process, therefore, provides for significant savings in material.

The thermosetting materials usually employed in runnerless injection processes differ in some respects from materials normally employed in conventional injection processes because of the different requirements of each process. One significant difference is that a standard injection molding material typically has a stiffer plasticity. In contrast, a runnerless injection material is adapted to remain in a plasticized or fused condition in the feed system for extended periods of time without prematurely curing, usually at temperatures between about 104° and 116° C. (220° to 240° F.), while also being capable of rapidly curing in the mold cavity at the molding temperature, usually about 170° C. (340° F.). Examples of suitable runnerless injection molding compositions are described in U.S. Pat. Nos. 4,210,732; 4,239,869 and 4,241,201, all entitled, "Phenolic Resins With Improved Low Temperature Processing Stability". The disclosure in the foregoing patents is hereby incorporated by reference. Although such formulations are useful in the present apparatus, they are not required, and the molding compositions presently utilized may be selected from the more economical and more readily available standard thermosetting molding compositions.

Thermosetting molding materials useful in the present invention may suitably be selected from thermosetting synthetic resins and resin compositions typically used in molding operations; for example, phenolic; amino, such as urea, melamine and melamine/phenolic; polyester resins in granular, nodular, bulk or sheet forms; alkyd; epoxy; silicone; diallylphthalate; polyamides; or from thermosetting natural and synthetic rubber compositions. Phenolic resin compositions are especially useful as the feed material. Phenolic resin compositions used in molding operations are usually employed in the form of molding compositions. Phenolic molding compositions typically are particulate in form, containing a molding grade phenolic resin, a cross-linking agent, such as hexamethylenetetramine, and suitable filler materials.

The technique of injection—compression molding basically consists of injecting a charge of plasticized molding material into a partially open mold; the final fill, or mold fit, is accomplished by the subsequent complete closure of the mold. Injection—compression molding makes possible a combination of the positive attributes of compression molding, i.e., improved dimensional stability, uniform density, low shrinkage and high impact strength, with the advantages of automation and fast cure of injection molding.

The present invention provides an improved apparatus for adapting the advantages of injection—compression molding to include the advantages of runnerless injection techniques and facilitates the use of standard phenolic molding compositions in such apparatus. The present apparatus allows the use of commercially available, standard nozzles in runnerless injection—compression molding processes. Heretofore, adaptations were required in the nozzle and distribution system to obtain the foregoing advantages.

GENERAL DESCRIPTION OF THE INVENTION

The present invention provides an improved molding apparatus for injection—compression molding of thermo-setting molding materials. The apparatus comprises a stationary platen assembly and a movable platen assembly.

The stationary assembly is comprised of a stationary platen member, or support plate, a heated plate mounted on the support plate and a plurality of mold faces mounted on the heat plate. The stationary assembly has a cooled sprue bushing positioned therein and extending therethrough. The sprue bushing has a receiving end adapted to engage, usually by contact, with the nozzle member of an injection molding machine. The sprue bushing has a discharge end adapted to feed thermosetting molding material therethrough. The temperature maintained in the sprue bushing is sufficiently high to maintain the thermosetting molding material within the bushing in a plasticized state and sufficiently low that no substantial curing or setting-up of the thermosetting molding material takes place. By substantial curing or setting-up of the thermosetting molding material is meant the amount of premature polymerization which would adversely inhibit the plasticity or mobility of the molding material.

The movable assembly is comprised of a movable platen member, or support plate, a heated plate mounted thereon and a plurality of mold faces mounted on the heat plate corresponding to, and adapted to be aligned with, the mold faces on the stationary assembly to form mold cavities. Alternatively, the movable assembly has a cooled portion thereon corresponding to, and adapted to be aligned with, the discharge end of the sprue bushing in the stationary assembly.

In the injection, or feed, stage, the movable assembly is positioned to bring the mold faces on the movable assembly into close proximity with the corresponding and aligned mold faces on the stationary assembly to form partially open mold cavities. Thermosetting molding material in a plasticized state is then fed through the nozzle member, sprue bushing, manifold area, into the partially open, heated mold cavities. The manifold area may suitably contain runner channels which consist of channels, or grooves, in one of the assemblies and aligned, matching, protuberances, or extensions, in the other assembly. The protuberances are of a size that, when the mold is partly open, as in the injection stage, they form a side portion of the runner channel and, when the mold is closed, they fit within and effectively close the corresponding channels, or grooves. When the mold is closed, the manifold area, including any runner channels, is eliminated, and any material therein is forced back into the nozzle or into the mold. The grooves and matching protuberances, which form a gate or channel in the injection stage, form a part of the land in the compression stage.

In the compression stage, the heated mold cavities are then closed completely by further movement, suitably by hydraulic and/or mechanical means, of the movable assembly in a direction toward the stationary assembly. Upon closure of the mold faces, the thermosetting material within the confines of the mold cavities is thus pressed and heated to a temperature sufficiently high to cure the material.

After curing, the movable assembly is retracted, moved away from, the stationary assembly, suitably by hydraulic and/or mechanical means, to remove the molded article and provide access to the mold face and surrounding area. The loss of material ordinarily in the runner channels has been eliminated, as no runner channels were in being during the compression step. The thermosetting material remaining in the nozzle and sprue is maintained in a plasticized, substantially uncured state, ready for the next shot or filling operation.

DETAILED DESCRIPTION OF THE INVENTION

The present invention will be illustrated and more fully described by reference to the accompanying drawings.

FIG. 1 is a cross-sectional, partly schematic view of an apparatus of the present invention. The apparatus shown is a portion of an injection molding machine having a horizontal clamping arrangement. As shown in FIG. 1, the apparatus is in the injection or feed stage of the molding cycle. In this stage, thermosetting molding material is fed into partially open molds.

FIG. 2 shows the apparatus of FIG. 1 in the compression stage. In this stage the molds are completely closed. The thermosetting material within the confines of the closed mold during this stage is pressed and heated to cure the enclosed material to the shape of the mold cavity, FIG. 3 shows the apparatus of FIG. 1 in an open position. In this position the movable platen assembly has been actuated to move in a direction away from the stationary platen assembly, allowing the removal of the molded articles from the open mold faces and surrounding area in preparation for repositioning the components in the feed stage as shown in FIG. 1.

Figure 6:
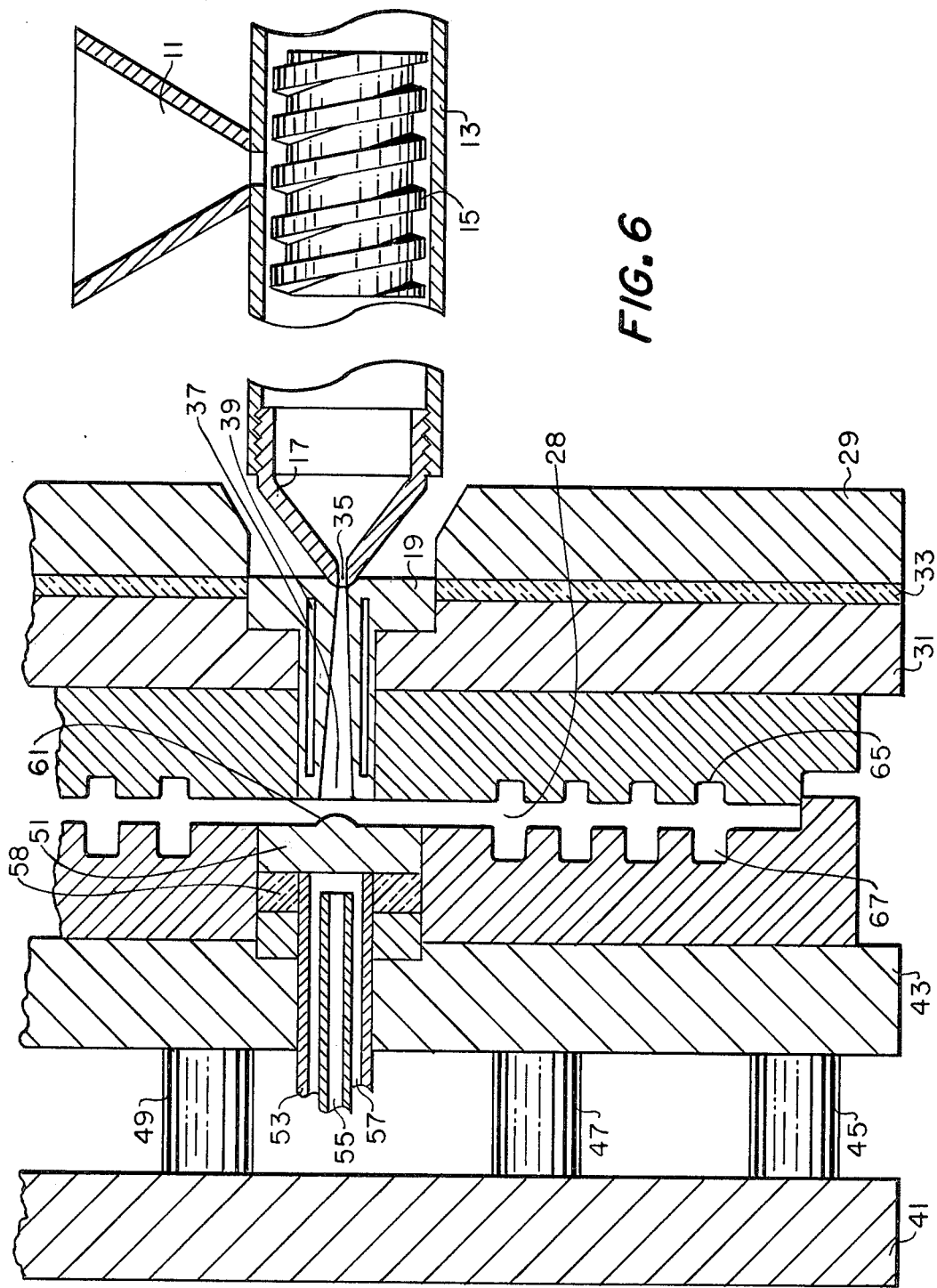

FIG. 6 is a cross-sectional, partly schematic view of an alternate mode of the present invention. The figure shows a portion of an injection molding machine adapted to pot molding. As shown, the apparatus is in the injection, or feed, stage.

Figure 7:
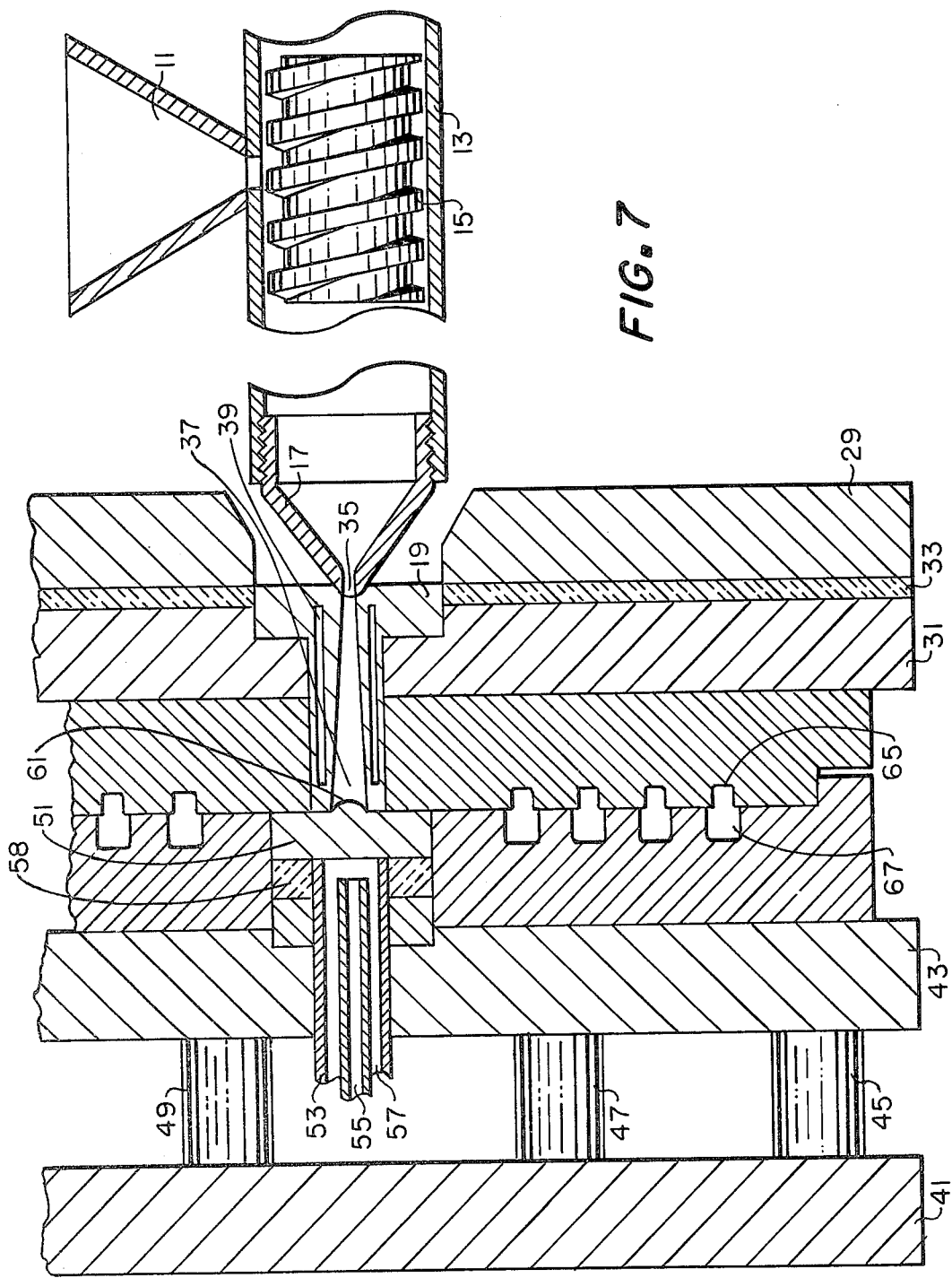

FIG. 7 shows the apparatus of FIG. 6 in the compression, or closed, stage.

Figure 8:
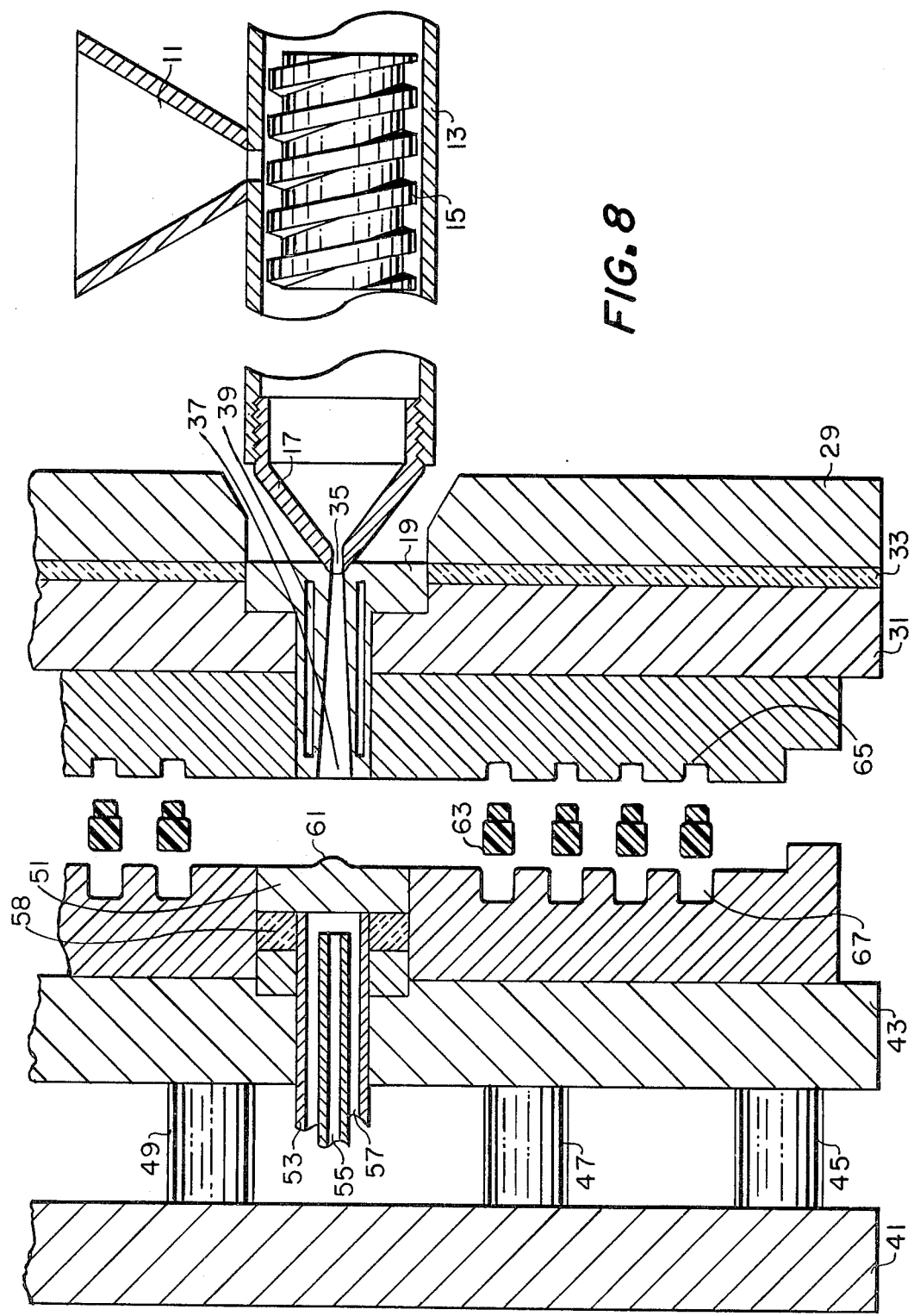

FIG. 8 shows the apparatus of FIG. 7 in an open position.

Figure 1:
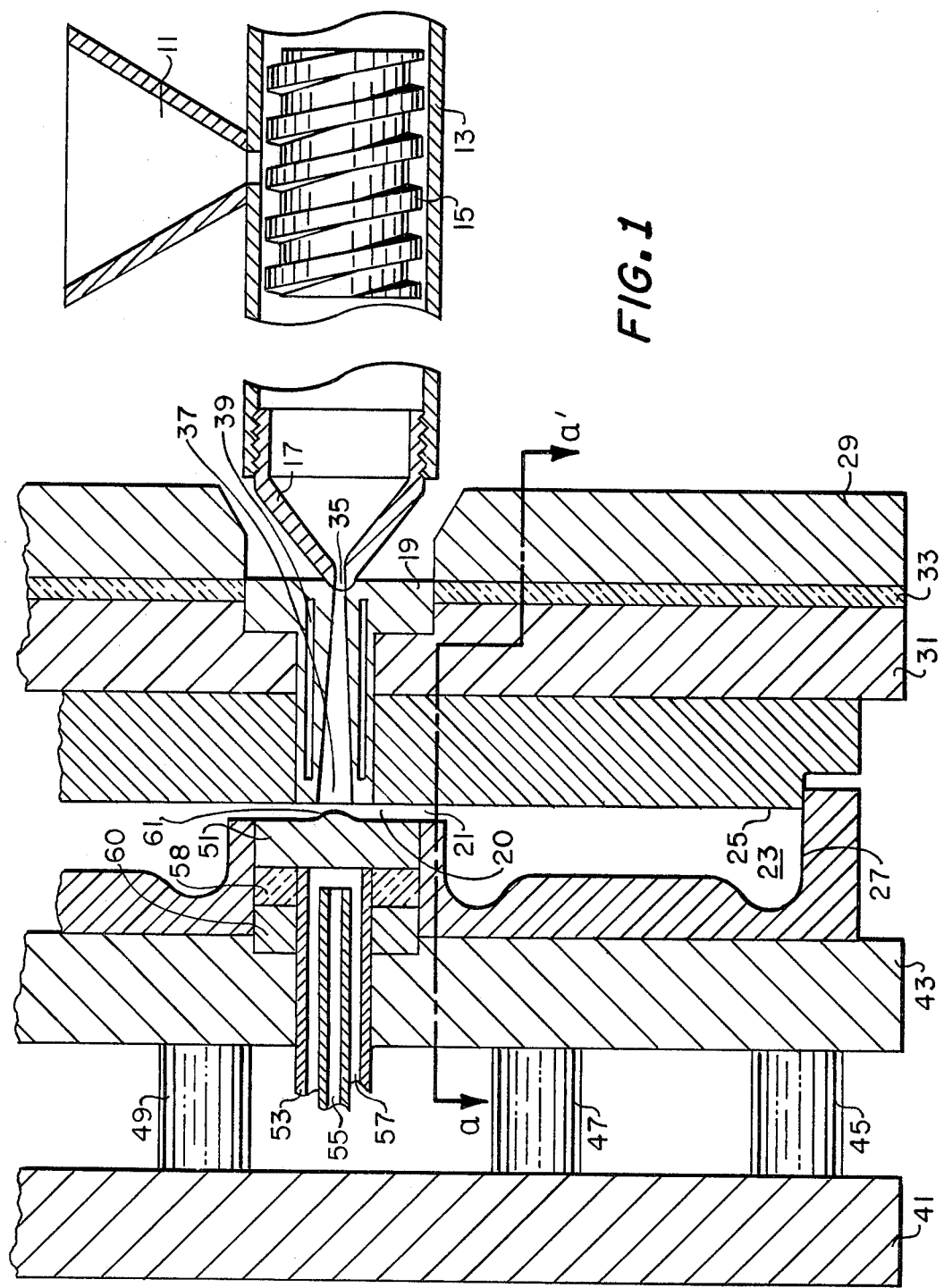

Looking now at FIG. 1, thermosetting molding material is fed into feed hopper 11 and then into a plasticizing zone formed by heated barrel 13 and by the mechanical working of screw 15. A predetermined amount of plasticized molding material is subsequently injected by screw 15, acting as a ram, through nozzle member 17, through sprue member 19, through manifold area, or reservoir, 20, through runner channels, such as 21, into mold cavities, such as 23, formed by partially open mold faces, such as 25 and 27.

The stationary assembly is comprised of stationary platen, or support plate, 29, which has stationary heat plate 31 mounted thereon. Suitably, heat plate 31 is separated from platen 29 by a layer of insulation 33, e.g. insulation board. Heat plate 31 has a plurality of mold faces, such as 25, mounted thereon. Heat plate 31 may suitably be heated by the circulation of steam or hot oil therethrough but, more preferably, electrically. Heat plate 31 supplies heat to mold faces, such as 25. The temperature maintained on the mold faces is sufficiently high that, when combined with the pressure generated when the mold is completely closed, will cure, or set, the thermosetting material within the mold cavity. Temperatures in a range between about 135° and about 216° C. (275° to 425° F.) are generally useful, and, within that range, temperatures between about 149° and about 199° C. (300° to 390° F.) are particularly useful for a wide variety of thermosetting mold materials.

The stationary assembly has sprue member 19 therein and extending therethrough. Sprue member 19 has a receiving end 35 adapted to engage, by contact, nozzle member 17 and has a discharge end 37. Sprue member 19 has a cooling means therein to maintain a temperature within the sprue member below the temperature at which any substantial curing of the thermosetting molding material will occur and sufficiently high to maintain the thermosetting material in a plasticized condition. Temperatures below which any substantial curing takes place are temperatures which are sufficiently low that the fluidity of the plasticized thermosetting feed material is not permanently affected. Generally, temperatures in the range between about 77° and about 143° C. (170° to 290° F.) are useful, and temperatures from about 99° to about 116° C. (210° to 240° F.) are preferably maintained.

Suitably, sprue bushing 19 is cooled by the circulation of a liquid, such as water, at the desired temperature through internal cavities, or channels, such as 39.

The movable assembly consists of movable platen, or support plate, 41, which has heat plate 43 mounted thereon and movable therewith. Heat plate 43 has a plurality of mold faces, such as 27, mounted thereon, positioned to align in register with corresponding mold faces, such as 25, of the stationary platen assembly. Support blocks, such as 45, 47 and 49, are suitably utilized between platen 41 and heat plate 43 to provide space for a part removal system, such as knock-out rods or pins, not shown. The movable assembly is adapted to be moved reciprocally as a unit, by means not shown, but suitably hydraulically and/or mechanically, in and out of aligned contact with the stationary platen assembly. In a most preferred embodiment, movable heat plate 43 is provided with a temperature-controlled area therein. The temperature-controlled area is positioned to be aligned with, and contiguous to, the discharge end of sprue bushing 19 when the mold faces are in a fully closed position. The temperature-controlled area is provided by a temperature-controlled plate 51. Plate 51 is suitably cooled by water contact through pipe 53, inlet, or burbler 55 and outlet 57.

Plate 51 is preferably separated from direct contact with heat plate 43 along adjacent faces thereof by insulation, such as 58, and may include a spacer, such as 60. Temperature-controlled plate 51 is maintained at a temperature lower than that at which any substantial curing of the thermosetting molding material occur, but sufficiently high that the thermosetting molding material will remain in a plasticized state. Generally, temperatures between about 77° and about 143° C. (170° to 290° F.) are utilized, and, within that range, temperatures between about 99° and about 116° C. (210° to 240° F.) are aptly suited.

In a particularly preferred embodiment of the invention, plate 51 has a radius conical portion 61 positioned opposite the discharge end 37 of sprue bushing 19. In the filling stage, portion 61 acts to distribute the thermosetting molding material through manifold area 20 into the runner channels, and, in the closed stage, acts to fit within and close off the discharge end 37 of sprue bushing 19.

Movable heat plate 43 is suitably heated by the circulation of steam or heated oil therethrough but, more practically, electrically, to maintain a temperature on the mold faces, such as 27, comparable to that maintained on the corresponding mold faces, such as 25, that is, a temperature sufficiently high to cure the thermosetting material upon complete closure of the mold faces.

In the injection stage as shown in FIG. 1, mold faces, such as 27, are provided with runner channels, such as 21 connecting the mold cavities with manifold area, or reservoir, 20, formed by the discharge end 37 of sprue bushing 19 and temperature-controlled plate 51.

Figure 4:
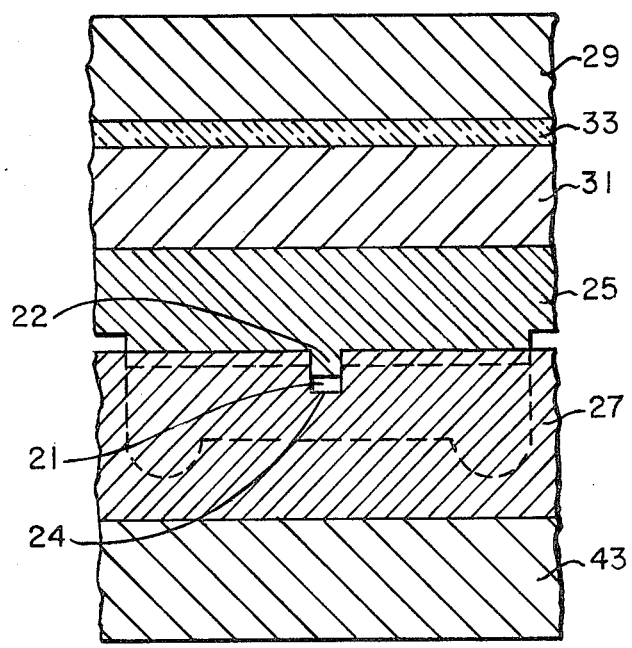
FIG. 4 is a partial sectional view taken along a—a' of FIG. 1.

The plasticized molding material fills the mold cavity formed by partially open mold faces 25 and 27. The distance the mold faces move from a partially open position to a fully closed position generally ranges between about 0.06 and about 0.50 inches and, more preferably, between about 0.10 and about 0.2 inches. This distance is also the clearance through the runner channels, such as 21, through which the thermosetting molding material passes from manifold area 20 to the mold cavities. The runner channels are formed by a groove and protuberance arrangement shown in FIGS. 4 and 5. FIG. 4 is a partly sectional drawing taken along a—a' of FIG. 1. Plate 31 of the stationary assembly is provided with grooves, such as 24. The movable assembly is equipped with protuberances, such as 22, corresponding to, and adapted to fit within, the grooves and fill the grooves when the molds are in a fully closed position. In the fill stage as shown in FIG. 1, the grooves and protuberances form runner channels, such as 21. Runner channels having openings less than about 0.06 inches usually do not allow an easy flow of the molding materials through the channels, and openings greater than about 0.50 inches frequently yield an excess of flash in the area around the mold faces upon closure of the molds.

Figure 2:
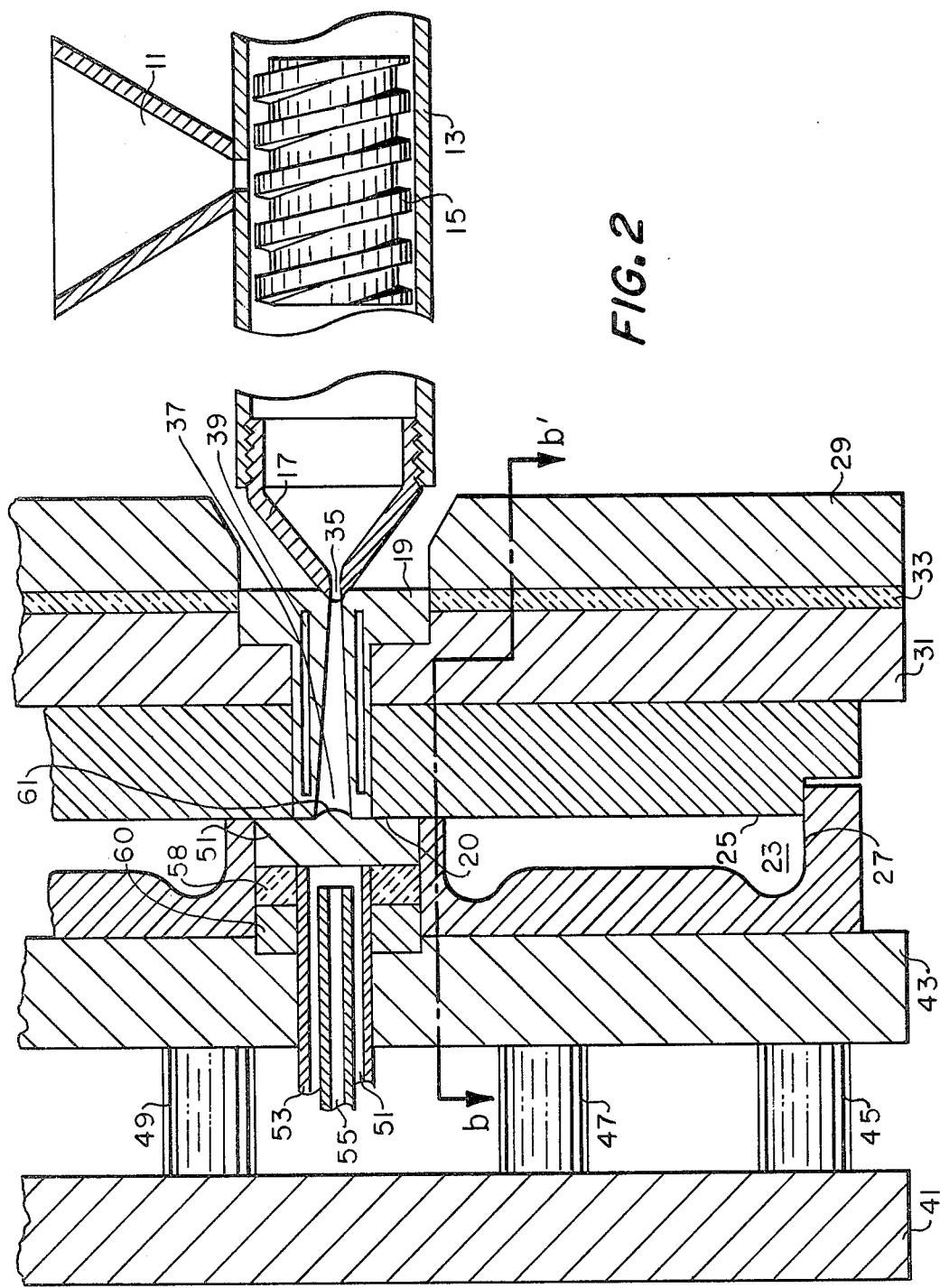
Figure 5:
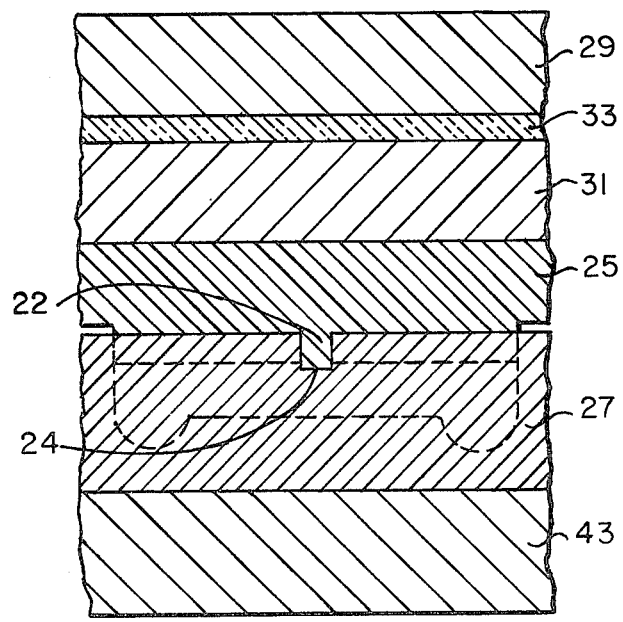
FIG. 5 is a partial sectional view taken along b—b' of FIG. 2.

FIG. 2 shows the apparatus of FIG. 1 in a closed or compression stage of the molding cycle. Movable platen assembly has moved toward the stationary platen assembly to close aligned mold faces, such as 25 and 27, and, as shown in FIG. 5, protuberances, such as 22, have moved to fill grooves 24, eliminating the runner channels, such as 21, when the mold is closed. Although the runner channels are more practically of a square cross-sectional form, as shown in greater detail in FIGS. 4 and 5, any configuration that will receive and be filled by a corresponding protuberance may be utilized. For example, channels and corresponding protuberances of a half-round shape may be used. In the closed stage, the thermosetting molding material previously fed into the space between the partially open mold faces is pressed and heated to cure the enclosed material to the internal shape of the mold.

Figure 3:
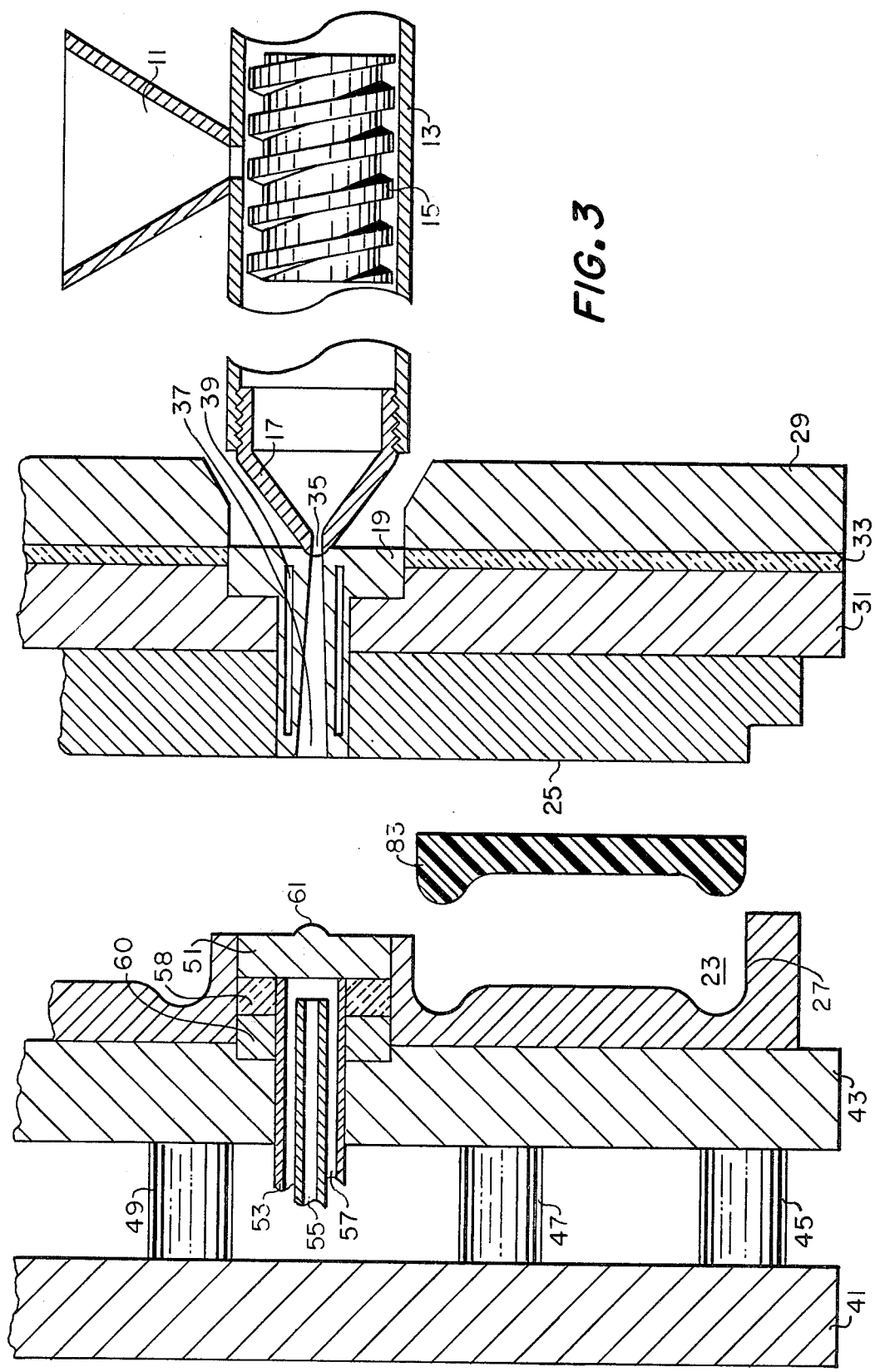

FIG. 3 shows the apparatus of FIG. 1 in an open position. In this position, the movable platen assembly has been retracted, or moved away from, the stationary assembly. The molded articles, for example, 63, are removed from the molds, suitably by the aid of knock-out pins, not shown, usually positioned in the movable mold faces. In this position, any flash is removed, the channel and mold faces are cleaned, if necessary, and the components readied for repositioning as shown in FIG. 1. At the point shown in FIG. 3, the thermosetting molding material in the nozzle and sprue bushing is stored in a plasticized, substantially uncured state in preparation for the next shot, or injection, of thermosetting material into the mold cavities.

FIG. 4 is a partial cross-sectional view taken along a—a' of FIG. 1 showing in greater detail the position of grooves 24 and protuberances 22 to form runner channels, such as 21, when the apparatus is in a filling stage.

FIG. 5 is a partial cross-sectional view taken along b—b' of FIG. 2 showing in greater detail the position of protuberances 22 and grooves 24 to eliminate runner channels, such as 21, when the apparatus is in the closed stage.

FIG. 6 illustrates an alternate mode of the present invention wherein the apparatus is adapted to pot molding. Similar components are numbered and identified as in FIGS. 1 through 3. In this embodiment, the thermosetting molding material is fed through sprue member, or bushing, 19 into an extended manifold area 28, which feeds a plurality of mold cavities formed by partially open mold faces, such as 65 and 67. In FIG. 6, the apparatus is shown in the filling stage.

FIG. 7 shows the apparatus of FIG. 6 in a closed stage. In this stage, the mold cavities, such as those formed by mold faces 65 and 67 are closed.

FIG. 8 shows the apparatus of FIG. 6 in an open stage wherein the molded articles, such as 63, are removed by operation of knock-out rods, not shown. In this position, the mold faces are accessible for cleaning and subsequently for repositioning as in FIG. 6 for repeated molding operations.

The apparatus components are preferably fabricated of mold steels selected to withstand the conditions of use.

It will be understood that the present invention provides for the employment of a plurality of mold cavities fed by a single nozzle member. Preferably, the mold cavities, positioned around the periphery of the sprue bushing, are balanced, that is, each of the cavities requires approximately an equal amount of plasticized material for filling.

For purposes of simplicity, the present invention has been described in terms of a horizontal clamping arrangement; however, it will be appreciated and understood that the invention is equally adapted to, and useful in, vertical clamping arrangements.

The foregoing description and embodiments are intended to illustrate the invention without limiting it thereby. It will be appreciated that various modifications can be made in the invention without departing from the spirit and/or scope thereof.

In the above-described drawings, the visible edges and exposed surfaces behind the cutting plane have been omitted in the vicinity of the mold cavities to simplify the drawings and facilitate the understanding of the apparatus of the invention.

What is claimed is:

1. An improved injection-compression molding apparatus comprising:
   a stationary assembly comprised of:
      a stationary platen member,
      a heat plate mounted thereon, means to heat said plate,
      a plurality of mold faces mounted on said heat plate, and
      a cooled sprue bushing extending through said stationary assembly having a receiving end adapted to engage the nozzle of an injection molding machine and a discharge end positioned contiguous to said heat plate;
   a movable assembly comprised of:
      a movable platen member,
      a heat plate mounted thereon, means for heating said plate, and
      a plurality of mold faces mounted on said heat plate corresponding to and positioned to be aligned with the mold faces on said stationary assembly to form a plurality of mold cavities;
   means to move said movable assembly to bring said movable mold faces into close proximity and aligned with corresponding faces in said stationary assembly to form partially open mold cavities and forming a cooled manifold area between the discharge end of said sprue bushing in the stationary assembly and said movable assembly;
   means for feeding a supply of plasticized thermo-setting molding material into the receiving end of said sprue bushing into said partially open mold cavities;
   means for closing said partially open mold cavities to a closed stage to cure any thermosetting material enclosed within the mold cavities by pressure and heat and eliminating said manifold area; and
   means for retracting said movable assembly to separate said mold faces and remove a molded article.

2. The apparatus of claim 1 wherein the said manifold area feeds directly into said plurality of mold cavities.

3. The apparatus of claim 1 wherein the stationary assembly has a plurality of channels extending from said cooled manifold area to said mold cavities and said movable assembly has a plurality of protuberances corresponding to, and aligned with, said channels, said protuberances fitting within and filling said channels when the apparatus is in said closed stage.

4. The apparatus of claim 1 wherein the movable assembly has a plurality of channels extending from the cooled portion of said heat plate to said mold faces and said stationary assembly has a plurality of protuberances corresponding to, and aligned with, said channels, said protuberances fitting within and filling said channels when the apparatus is in said closed stage.

5. The apparatus of claim 1 wherein the movable assembly has a cooled portion therein positioned to be aligned with the discharge end of the sprue bushing in the stationary assembly and forming part of said cooled manifold area when the mold faces are partially open.

6. The apparatus of claim 5 wherein said cooled portion in said movable assembly is comprised of a temperature-controlled plate member maintained at a temperature lower than that at which any substantial curing of the thermosetting molding material will occur but sufficiently high to maintain the molding material in a plasticized condition.

7. The apparatus of claim 6 wherein the temperature is maintained between about 77° and about 143° C.

8. The apparatus of claim 1 wherein the temperature at the mold face is maintained between about 135° and about 216° C.

9. The apparatus of claim 8 wherein the temperature in the sprue bushing is maintained at a temperature sufficiently low that no substantial curing of the thermosetting molding material may occur and sufficiently high to maintain the molding material in a plasticized condition.

10. The apparatus of claim 1 wherein the means for controlling the temperature within said sprue bushing comprises a reservoir within said bushing adapted to circulate therethrough a liquid of the desired temperature.

11. The apparatus of claim 10 wherein the temperature in the sprue bushing is maintained at a temperature with the range of between about 77° and about 143° C.

* * * * *